United States Patent Office
3,437,596
Patented Apr. 8, 1969

3,437,596
NOVEL BOROXAROPHENANTHRENE-AMINE
COMPOUNDS AS ANTIOXIDANTS
Leo J. McCabe, Glassboro, N.J., assignor to Mobil Oil
Corporation, a corporation of New York
No Drawing. Filed July 18, 1966, Ser. No. 565,689
Int. Cl. B01j 1/16; C10m 1/14
U.S. Cl. 252—49.6         15 Claims

ABSTRACT OF THE DISCLOSURE

Reaction of a 10-hydroxy, -alkoxy, -aryloxy, or -halo 10,9-boroxarophenanthrene or the anhydride thereof and an amine produces novel reaction products which may be used in organic fluids to prevent oxidation deterioration. Tertiary alkyl primary amines and secondary aromatic amines are the preferred amine reactants.

---

This invention relates to the stabilization of organic compositions. More particularly, it relates to oxidative stabilizers for lubricant and fuel compositions consisting of novel boron compounds.

Organic compositions, such as lubricating compositions, fuels, plastics and the like may be fortified against oxidative attack by compounding therewith additives known as antioxidants. Quite often, however, such additives are not always successful in protecting the base medium from oxidative deterioration. For example, the operating conditions of modern day automotive or aircraft engines are known to increase the oxidation breakdown of lubricants. Oxidation of such compositions lead to the formation of corrosive acids, sludge and other resinous deposits. These products may seriously interfere with the operation of the enigne as well as reducing the lubricating properties of the composition. Moreover, the acids are often strong enough to corrode the metal parts of the engine. Therefore, the discovery of newer and more effective antioxidants is desirable.

Therefore, an object of this invention is to provide novel reaction products capable of increasing the oxidative stability of lubricant and fuel compositions. Another object is to provide novel boron compounds which can control the extent of acidity and viscosity of lubricant and fuel compositions under high temperature oxidative conditions. A further object is to provide lubricant and fuel compositions possessing improved oxidation stability containing these novel boron compounds.

It has now been discovered that organic compositions normally susceptible to oxidation deterioration have improved oxidation stability by combining therewith a novel boron compound containing the product of a reaction between a 10,9-boroxarophenanthrene with an amine. The products of condensation obtained from reacting these two reactants form effective antioxidants for hydrocarbon and other organic fluids, such as petroleum and fuel compositions and synthetic lubricants, and other industrial fluids. Greases and solid fuels and polymers capable of being compounded are also benefited by the compounds of this invention.

The 10,9-boroxarophenanthrene suitable for producing the compounds of this invention has the following general formula

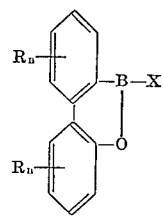

wherein X may be hydroxy, alkoxy, aryloxy, said groups containing from 1 to about 20 carbon atoms, halo, or the anhydride form

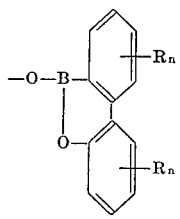

and the R groups are alkyl, cycloalkyl, aryl, alkaryl, aralkyl and derivatives thereof containing halogen, oxygen, nitrogen or sulfur atoms having from 1 to about 30 carbon atoms and preferably from 1 to about 18 carbon atoms; and $n$ is from 0 to 4. These compounds are disclosed in U.S. patent application Ser. No. 365,184, filed on May 5, 1964, now U.S. Patent No. 3,287,270. The preparation of these compounds has been described by Dewar and Dietz, "Journal of Chemistry Society" (London), page 1344 (1960).

As an illustration of a procedure for preparing the boroxarophenanthrene, ortho-phenylphenol is reacted with excess boron trichloride. The product of this reaction is heated in the presence of aluminum chloride to produce the chloro derivative. The chloro derivative may be subsequently hydrolyzed by treating it with water to yield the hydroxy derivative. A typical reaction is shown in the sequence below:

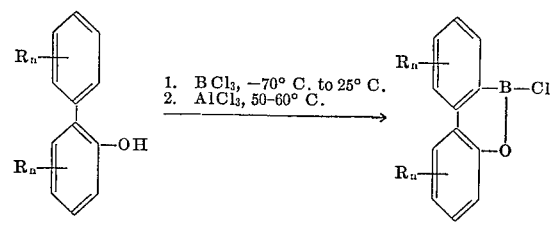

The resulting product, either in the form of halogen or hydroxy derivative, is then reacted with the desired amine. The reaction is a displacement of the halogen or hydroxyl group with the amino, forming a boron-nitrogen bond. These reactions are illustrated as follows:

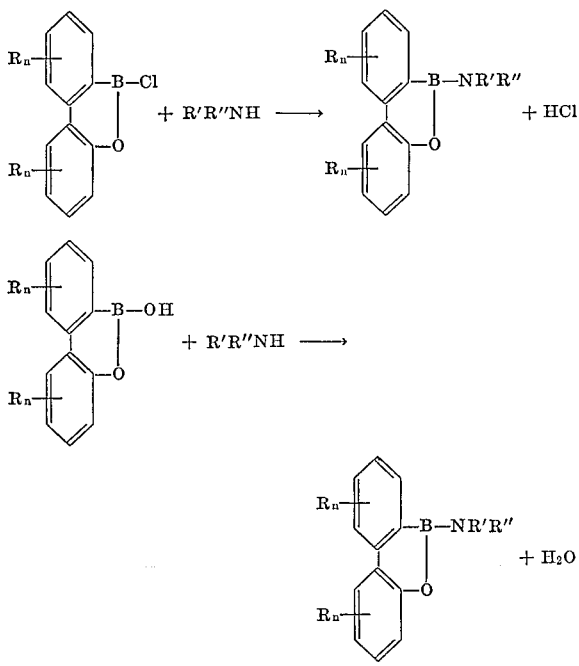

Reaction with anhydride requires two moles of amine. The groups, R′ and R″, may be alkyl or aryl or substituted derivatives thereof, as described more fully hereinafter.

The organic amine reactant used in this invention may be an alkyl amine, an aryl amine or an alkyl aryl amine. The preferred alkyl amines include primary, secondary or tertiary alkyl amines in which the alkyl portion may have straight chain or branched or cycloalkyl carbon atoms. The number of carbon atoms per alkyl group may range from 1 to about 30 carbon atoms. Tertiary alkyl primary amines are most preferred. With respect to the aromatic amines, aromatic secondary amines are preferred, such as phenyl-1-naphthylamine and phenyl-2-naphthylamine. Alkyl aryl secondary amines, such as dioctyl diphenyl amine, are also useful. The nucleus in these aromatic amines may have alkyl substituents having 1 to about 30 carbon atoms.

The organic compositions in this invention may utilize as the base medium solvent-refined mineral oils of lubricating viscosities, and liquid fuels. Of great interest, in view of the stringent requirements of modern engines, are the synthetic fluid lubricants, such as the polyolefin fluids, polyalkylene oxide fluids, silicone fluids, polyphenyl ethers, polyacetals and especially synthetic ester fluids. In this last category are the diesters prepared from the monohydric and dicarboxylic acids, such as di-2-ethylhexyl sebacate, di-2-ethylhexyl azelate, esters of trihydric alcohols and monocarboxylic acids, such as trimethylolpropane trioctonoate, trimethylolpropane tridecanoate, and trimethylolbutane hexanoate, and pentaerythritol esters of monocarboxylic acids, such as pentaerythritol tetraoctonoate, and pentaerythritol tetradodecanoate. Particularly preferred in this invention are pentaerythritol esters prepared from mixed acids. The acids used in the formation of these acids for producing suitable synthetic ester fluids may range from 1 to about 30 carbon atoms. Solid organic substances such as greases and solid fuels capable of being uniformly compounded are included in this invention. Polymeric base media include polyvinyl, polyallyl, polystyryl polymers; polyethylene, polypropylene and polybutylene polymers; polyamides, and the like. The concentration of the novel antioxidants of this invention in the organic compositions may range from about 0.05% to about 10% by weight of total composition.

The examples following are intended to illustrate the invention without limiting the scope thereof.

Example I

Into a reaction vessel containing a stirrer, a thermometer and a reflux condenser with condensate trap were added 200 ml. of xylene, 30 grams (0.15 mole) of 10-hydroxy-10,9-boroxarophenanthrene and 29.6 grams (0.15 mole) of a mixture of $C_{12}$–$C_{14}$ tertiary alkyl primary amines. The mixture was refluxed at 150° C. for 2.5 hours. A total of 2.6 ml. of water collected in the Barrett trap (theory, 2.7 ml.). At the end of the reflux period, the remaining product was topped to 175° C. under 35 mm. Hg. On cooling the product solidified. A yield of 57.2 grams (100% of theory) was obtained.

Analysis.—Calc'd, percent: B, 2.88; N, 3.74. Found, percent: B, 2.83; N, 3.62.

Example II

An amount of 127.5 grams (0.75 mole) of o-phenylphenol in 200 ml. of methylene chloride, was added slowly under a nitrogen blanket to a mixture of 117.5 grams (1.0 mole) of boron trichloride in 250 ml. of methylene chloride. The temperature was maintained at −70° C. during the addition. After the addition was completed the reaction mass was stirred at the same temperature for 15 minutes and it was then allowed to warm gradually to room temperature. The mixture was stirred at room temperature for 14 hours during which time the evolution of hydrogen chloride had occurred. The methylene chloride was removed at 25° C. at 0.1 mm. Hg. The remaining product was dissolved in 400 ml. of hexane to which 5 grams of aluminum chloride was added. Then the reaction mixture was stirred at 50° C. for 13 hours. Hydrogen chloride evolved and had subsided by the end of the 13-hour period. The solvent was then stripped off and the remaining product was dissolved in benzene and filtered under a nitrogen blanket to remove the catalyst.

To this remaining filtrate was added 164 grams (0.75 mole) of phenyl-1-naphthylamine in 200 ml. of benzene at a slow rate at room temperature. The reaction mixture was heated to reflux (80° C.) during which time hydrogen chloride evolution was noticeable. The mixture was maintained at 80° C. for 7 hours until the hydrogen chloride generation was no longer observed. The solvent was then removed by stripping to 150° C. at 35 mm. Hg. The product was then analyzed.

Analysis.—Calc'd for $C_{28}H_{20}NOB$, percent: N, 3.52; B, 2.72; mol. wt., 397. Found, percent: N, 3.42; B, 1.89; mass spec. peak, 397.

Example III

A mixture of 19.6 grams (0.1 mole) of 10-hydroxy-10,9-boroxarophenanthrene and 21.9 grams (0.1 mole) of phenyl-1-naphthylamine was refluxed for 3.5 hours in 250 ml. of xylene. During this period 1.1 ml. of water was collected in the condensate trap; theory, 1.8 ml. water. The reaction mass was topped to 170° C. at 35 mm. Hg. A pale violet solid was obtained; yield 38.9 grams (99% theory).

Analysis.—Calc'd for $C_{28}H_{20}NOB$, percent: N, 3.52; B, 2.72; mol. wt. 397. Found, percent: N, 3.39; B, 2.56; mass spec. peak, 397.

Example IV

A mixture of 19.6 grams (0.1 mole) of 10-hydroxy-10,9-boroxarophenanthrene and 14.3 grams (0.1 mole) of 1-naphthylamine was heated at 150° C. for 5 hours in 200 ml. of xylene. The water collected in the condensate trap amounted to 1.4 ml. (theory, 1.8 ml.). The product was topped to 175° C. under a vacuum of 35 mm. Hg for 2 hours. The final product was a solid weighing 29.2 grams (90% yield).

Analysis.—Calc'd for $C_{22}H_{16}NOB$, percent: N, 4.4; B, 3.4. Found, percent: N, 3.5; B, 3.5.

EVALUATION OF PRODUCT

The novel condensation products of this invention were tested as antioxidants in lubricant compositions by subjecting an oil composition to a bulk oil oxidation test in which the test sample is subjected to a stream of air flowing through the oil at a rate of 5 liters per hour for 40 hours at 325° F. A solvent-refined midcontinent oil is used as the base stock. This test is performed in the presence of the following metals:

(a) 15.6 sq. in. of sand blasted iron wire;
(b) 0.78 sq. in. of polished copper wire;
(c) 0.87 sq. in. of polished aluminum wire; and
(d) 0.167 sq. in. of polished lead surface.

In this test the additive is evaluated as an oxidation inhibitor as measured by its ability to control the acidity and kinematic viscosity increase under oxidative conditions. The neutralization number (NN) and kinematic viscosity (KV) at 210° F. are recorded before and after oxidation treatment. The weight loss of the lead specimen is also reported. The results are tabulated in Table I below; the concentration in the oil being reported with the corresponding results:

TABLE I

| Additive | Conc., wt. percent | ΔNN | KV increase, percent | Lead loss, mg. |
|---|---|---|---|---|
| None | | 19.3 | 460 | 220.0 |
| Product of Ex. I | 2.0 | 0.30 | 7 | 0 |
|  | 1.0 | 0.59 | 8 | 0 |
|  | 0.4 | 0.79 | 15 | 0 |
| Product of Ex. II | 2.0 | 0.30 | 10 | 0.3 |
|  | 1.0 | 0.59 | 9 | 0.4 |
|  | 0.5 | 0.79 | 12 | 0 |
|  | 0.25 | 0.28 | 12 | 0.2 |
| Product of Ex. III | 2.0 | 0 | 9 | 0 |
|  | 1.0 | 0 | 20 | 0 |
|  | 0.5 | 10.2 | 58 | 16.9 |

The additives of this invention were also tested in a synthetic ester fluid prepared from pentaerythritol and a mixture of a C₅ acid and a C₉ acid. In this second series of tests the catalytic oxidation test described above is conducted at 425° F. for 24 hours, but the remaining conditions are the same. The results are tabulated in Table II below:

TABLE II

| Additive | Conc., wt. percent | ΔNN | KV Increase percent |
|---|---|---|---|
| None | | 8.5 | 265 |
| Product of Ex. I | 4.0 | 2.5 | 48 |
|  | 2.0 | 3.0 | 56 |
| Product of Ex. II | 2.0 | 1.6 | 32 |
|  | 1.0 | 1.8 | 30 |
|  | 0.5 | 2.5 | 44 |
| Product of Ex. IV | 1.0 | 3.3 | 208 |

The results of the tests in both types of fluids show that the novel compositions of this invention possess a high degree of antioxidant properties, particularly in protecting lead surfaces which are, as indicated, susceptible to corrosion during oxidation.

The additives of this invention are suitable in providing stability to polymers. The product of Example I is tested in a high impact styrene by the following test method:

Samples of test polymer containing about 0.2% of the additive is placed in a forced-air oven preheated to 185° C. After 2 hours of exposure to air and heat, the samples are removed and rated visually for color degradation. In this test, the polystyrene samples give a color rating of about 1; a rating of 1 indicates highest degree of stability.

The novel additives of this invention may be used in conjunction with other additives which provides additional properties to hydrocarbon compositions such as detergents, pour point depressants, extreme pressure agents, metal suppressors and other antioxidants.

This invention has been described in terms of specific embodiments, however, such description is not deemed to be a limitation in the invention except as appearing in the appended claims.

I claim:

1. An organic composition comprising a major proportion of an organic medium susceptible to oxidative deterioration and a minor proportion in an amount sufficient to provide oxidative stability thereto of a reaction product of a 10,9-boroxarophenanthrene containing an amine-reactive radical selected from the group consisting of hydroxy, alkoxy, aryloxy, halo and the anhydride of the said 10,9-boroxarophenanthrene, said groups having from 1 to about 30 carbon atoms, and an amine selected from the group consisting of primary alkyl amines, primary aromatic amines and secondary alkyl amines.

2. The organic composition of claim 1 wherein the organic medium is polystyrene.

3. The composition of claim 1 wherein the product has the structure

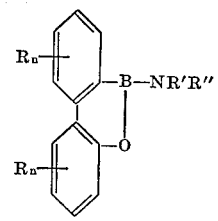

in which each R is selected from the group consisting of alkyl, cycloalkyl, aryl, alkaryl, aralkyl, having from 1 to about 30 carbon atoms and halogen; R' and R'' are each selected from the group consisting of hydrogen, alkyl, cycloalkyl, aryl, aralkyl and alkaryl having from 1 to about 30 carbon atoms, wherein at least one such group is one of the organic radicals recited, and wherein when one of R' and R'' is an aromatic radical, the other is hydrogen; and $n$ is from 0 to 4.

4. The composition of claim 3 wherein R' is hydrogen and R'' is a tertiary alkyl group.

5. The composition of claim 3 wherein R' is hydrogen and R'' is a $C_{12}$–$C_{14}$ tertiary alkyl group.

6. The composition of claim 3 wherein R' is hydrogen and R'' is naphthyl.

7. The composition of claim 1 wherein the organic medium is selected from the group consisting of liquid lubricants and greases made therefrom, liquid hydrocarbon fuels and hydrocarbon and polyamide polymers.

8. The composition of claim 7 wherein the organic medium is a hydrocarbon mineral oil.

9. The composition of claim 7 wherein the organic medium is a synthetic ester lubricating oil.

10. A method of producing the reaction product of claim 1 comprising reacting the 10,9-boroxarophenanthrene containing the amine-reactive radical with an amine selected from the group consisting of primary alkyl amines, primary aromatic amines, and secondary alkyl amines.

11. The method of claim 10 wherein the reaction sequence is as follows:

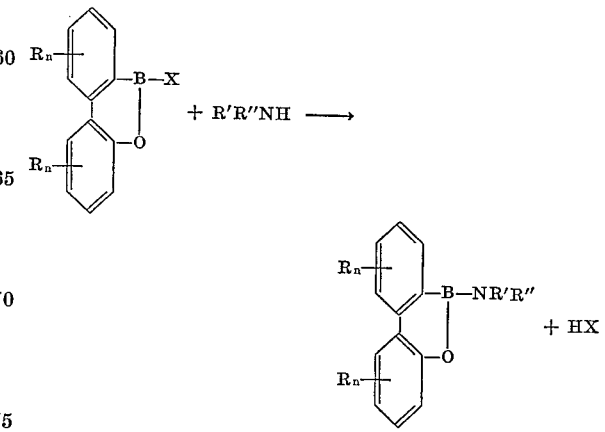

wherein X is selected from the group consisting of hydroxy, alkoxy, aryloxy, halo, and

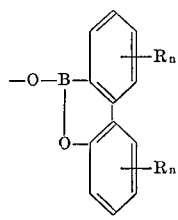

and each R is selected from the group consisting of hydrogen, alkyl, cycloalkyl, aryl, alkaryl, aralkyl, having from 1 to about 30 carbon atoms; R' and R" are each selected from the group consisting of hydrogen, alkyl, cycloalkyl, aryl, aralkyl and alkaryl having from 1 to about 30 carbon atoms, wherein at least one such group is one of the organic radicals recited, and wherein when one of R' and R" is an aromatic radical, the other is hydrogen; and $n$ is 0 to 4.

12. The method of claim 11 wherein R' is hydrogen and R" is a tertiary alkyl group.

13. As a novel composition of matter the reaction product of claim 11.

14. The novel composition of claim 13 wherein R' is hydrogen and R" is a tertiary alkyl group.

15. The novel composition of claim 14 wherein R" is a tertiary $C_{12}$–$C_{14}$ alkyl group.

References Cited

UNITED STATES PATENTS

| | | | |
|---|---|---|---|
| 2,931,831 | 4/1960 | Aries | 252—400 XR |
| 3,014,870 | 12/1961 | Reynolds et al. | 252—400 XR |
| 3,140,313 | 7/1964 | Kitasaki et al. | 252—49.6 XR |
| 3,320,165 | 5/1967 | Bridger et al. | 252—49.6 |

DANIEL E. WYMAN, *Primary Examiner.*

W. H. CANNON, *Assistant Examiner.*

U.S. Cl. X.R.

44—63; 252—400; 260—45.8, 462